Sept. 7, 1943.    N. T. MacKENZIE    2,328,823
JOINT FOR WOOD STRUCTURES
Filed Aug. 31, 1940    2 Sheets-Sheet 1
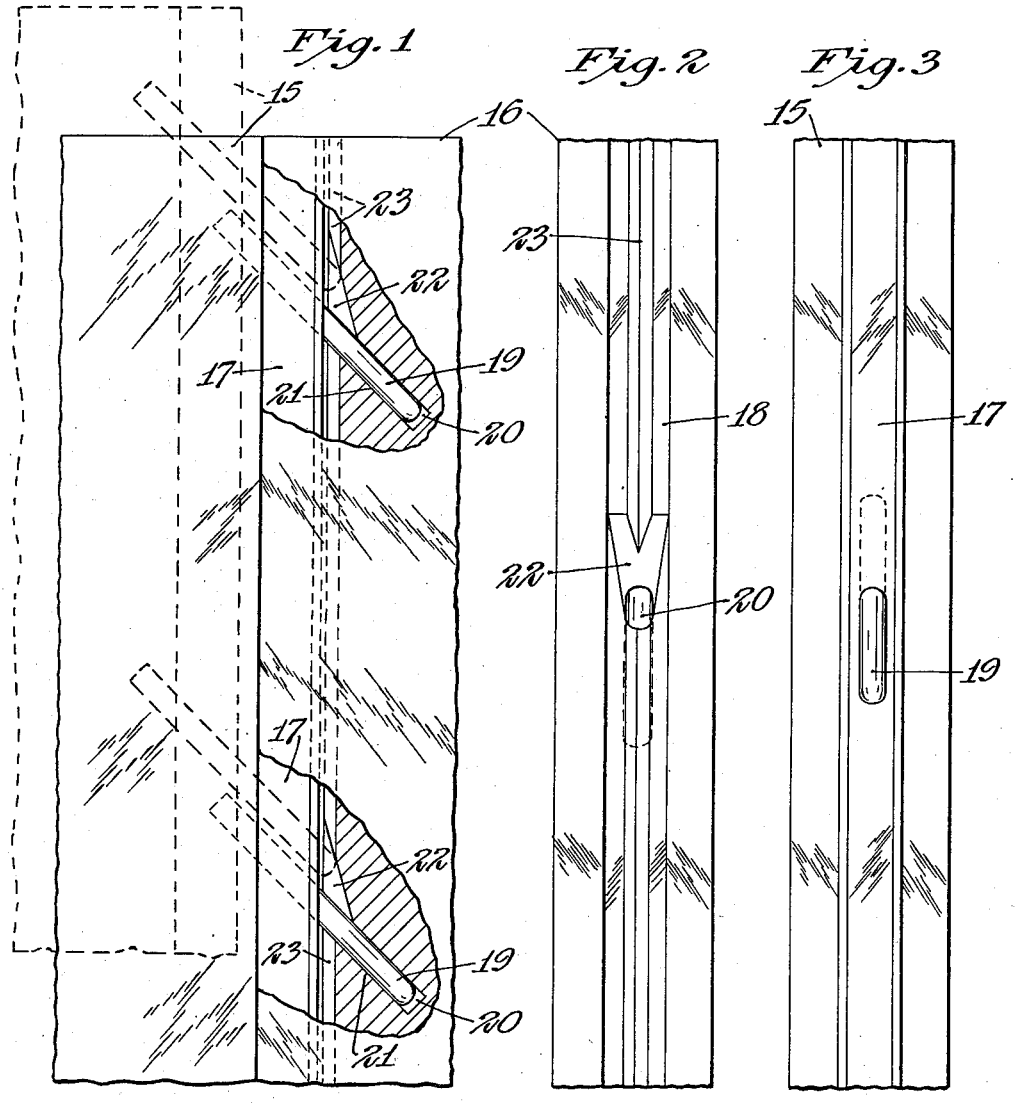
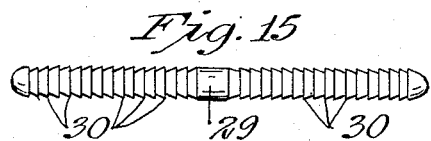
Inventor
Neal T. MacKenzie
By John E. Hyskell Jr.
Attorney Sept. 7, 1943.   N. T. MacKENZIE   2,328,823
JOINT FOR WOOD STRUCTURES
Filed Aug. 31, 1940   2 Sheets-Sheet 2
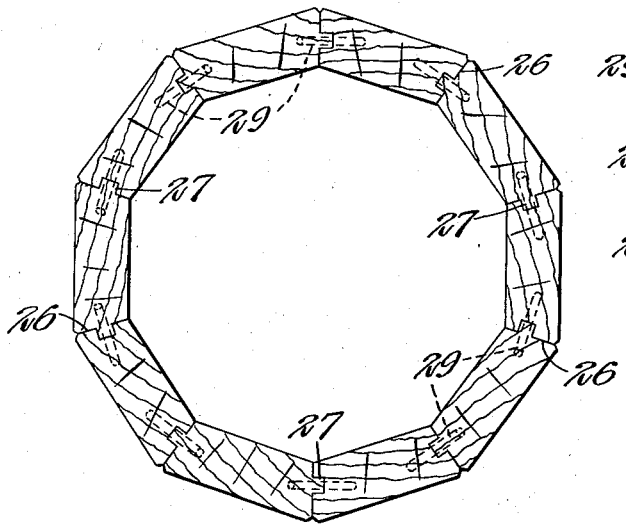
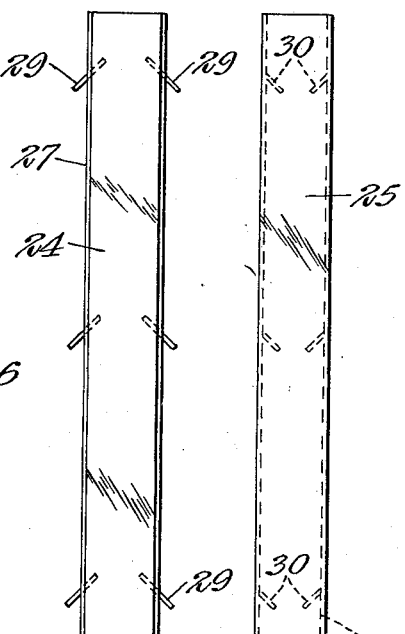
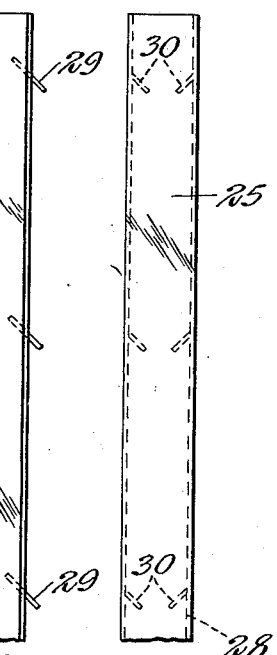
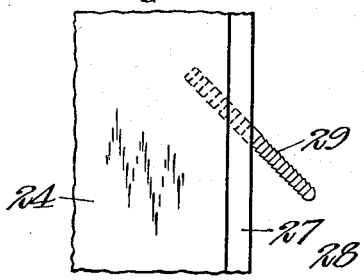
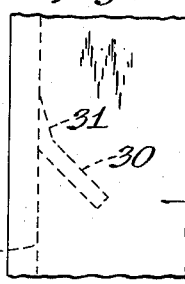
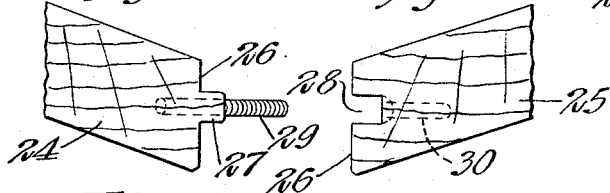
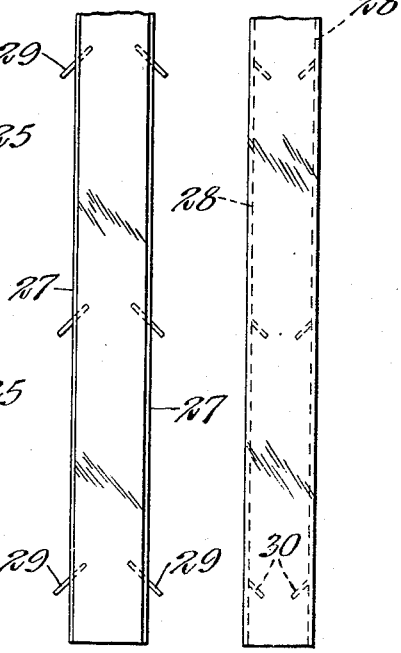
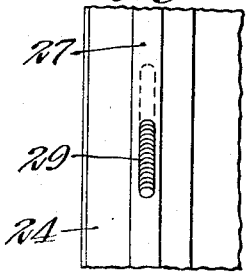
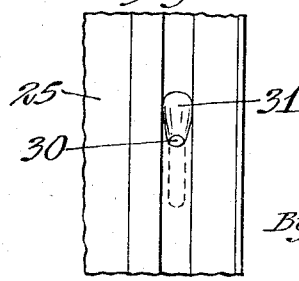
Inventor
Neal T. MacKenzie
By John E. Stryker Jr.
Attorney Patented Sept. 7, 1943

2,328,823

UNITED STATES PATENT OFFICE 2,328,823

JOINT FOR WOOD STRUCTURES

Neal T. MacKenzie, St. Paul, Minn., assignor to General Timber Service, Inc., St. Paul, Minn., a corporation of Delaware Application August 31, 1940, Serial No. 355,051

4 Claims. (Cl. 20—97)

It is an object of this invention to provide novel means for fastening abutting surfaces of wood members together.

A particular object is to provide one of the adjoining wood members with a plurality of parallel dowels projecting obliquely therefrom and the other member with dowel holes adapted to receive the dowels respectively whereby such members may be rigidly fastened together and forcibly retained against separation, the fastening being made by merely actuating one of the abutting members longitudinally relative to the other after aligning the dowels with the dowel holes.

Other objects will appear and be more fully pointed out in the following specification and claims.

My improved joint is adapted for use in connecting individual members together and also to connect pre-fabricated panels and sections of buildings together without the use of ordinary fastening means, such as nails, screws, bolts or the like. The invention has the further advantages that the conection may be quickly and easily made, the fastening members are entirely concealed in the finished structure and, by reason of the oblique arrangement of the dowels, they retain the edges of the members in permanent contact even under the stress caused by expansion and contraction of the wood members with changes in atmospheric moisture conditions and after drying following prolonged immersion in water. One important field for the use of the device is in the construction of culverts, wood pipes, columns and other tubular structures where is has been necessary heretofore to provide encircling bands of metal and where drying of the structure has heretofore resulted in opening up of the joints.

Referring to the accompanying drawings:

Figure 1 is a partial side elevation and partial central vertical section illustrating one form of my improved joint;

Fig. 2 is an elevation showing an edge of a wood member formed with a groove and one of the dowel holes;

Fig. 3 is a similar view of a member with the tongue and dowel projecting therefrom;

Fig. 4 is an end view of one of the members provided with a dowel;

Fig. 5 is a similar view of a grooved member;

Fig. 6 is an end view of a wood culvert or pipe with my improved joints between members;

Fig. 7 is a side elevation of one of the pipe members showing the arrangement of dowels and tongues thereon;

Fig. 8 is a similar view of a pipe member having grooves and dowel holes along both edges;

Figs. 9 and 10 are fragmentary side elevations illustrating respectively, on a larger scale, the tongue and groove members of a pipe or other tubular structure;

Figs. 11 and 12 are fragmentary end views respectively of the members shown in Figs. 9 and 10;

Figs. 13 and 14 are elevations showing portions of the edges of the same members, and Fig. 15 is a side view of one of the dowels formed with annular teeth.

As shown in Figs. 1 to 5, inclusive, the numerals 15 and 16 indicate respectively portions of wood members to be connected together. Extending along the edge of the member 15 is a tongue 17 adapted to fit into a groove 18 formed in the edge of the member 16 in the usual manner. A plurality of dowels 19 are fixed in the member 15 to project obliquely from the tongue 17 thereof. These dowels 19 preferably extend at an angle of approximately 45 degrees from the edge of the member 15, as best shown in Fig. 1. Dowel holes 20 are formed in the members 16 to register with the dowels 19 and to extend obliquely in from the inner extremity of the groove 18. The spacing and angles of the dowel holes conform accurately to that of the dowels 19 so that the edges of the members 15 and 16 may be forcibly drawn together by the wedge action produced by simultaneous contact of the dowels 19 with oblique surfaces, indicated by the numeral 21 in Fig. 1, within the dowel holes 20.

To facilitate insertion of the dowels 19 into the holes 20, I provide counter-sinks 22 above the dowel holes, as seen in Figs. 1 and 2. These counter-sinks are preferably formed by a tool having a conical head which is operated with its axis in alignment with the axis of the dowel hole. Longitudinally extending guide grooves 23 are also formed in the members 16 at the bottom or inner extremity of the grooves 18 to facilitate inserting the dowels 19 into the holes 20. In assembling the members 15 and 16, the dowels 19 are inserted in the grooves 20 and then the members 15 and 16 are moved longitudinally one relative to the other so that the outer extremities of the dowels 19 are slid along the grooves 23 until they enter the appropriate counter-sinks 22 and dowel holes 20. Further relative longitudinal movement of the members 15 and 16 causes the dowels to draw the edges of these members into firm contact with each other and to force the tongue 17 completely into the groove 18. Considerable force may be exerted to close the joint by driving the member 15 downward or the member 16 upward as seen in Figs. 1 to 3 inclusive while the other member is held or confined against longitudinal movement. Withdrawal of the dowels and separation of the edges of the members 15 and 16 may be accomplished by the application of force in the reverse direction but unintentional withdrawal or opening of the joint may be guarded against, with ease, by merely fastening another member across the ends of these members. However, under the ordinary conditions found in practice, the oblique arrangement of the dowels wedged in the dowel holes produces sufficient friction to prevent the withdrawal without any other or additional fastening.

Where my improved joint is used in the construction of pipes, culverts or other tubular structures, such as hollow columns and the like, I prefer to arrange the several members as illustrated in Figs. 6 to 14 inclusive. In this case the wood members comprise members 24 provided with a tongue on each longitudinal edge and members 25 formed with a groove on each edge to receive such tongues. The pipe illustrated in Fig. 6 is constructed from an even number of the members 24 and 25 alternately disposed around the periphery thereof. The several edge surfaces 26 of these members extend radially of the pipe and the tongues 27 project at right angles to the surfaces 26. The members 25 have grooves 28 to receive the tongues 27. Series of dowels 29 project from the edges of each of the members 24, preferably at an angle of approximately 45 degrees, to be received in dowel holes 30 extending into the members 25 from the bottom of the grooves therein. These dowel holes have counter-sink enlargements 31 to facilitate insertion of the dowels 29 which project from the outer edges of the tongues 27. As shown in Figs. 9, 11, 13 and 15, annular tooth-like rings 30 are formed on the dowels 29 to oppose withdrawal from the dowel holes and also from the drill holes in the members 24 in which the dowels are permanently secured.

In assembling the tubular structure the requisite number of the members 24 are arranged with all of the dowels projecting obliquely toward the same end and the members 25 are disposed with the dowel holes extending in a similar direction. The dowels may be started into the dowel holes manually, but as the dowels are designed to fit snugly in the holes, greater force is required to completely drive the dowels and draw the members 24 and 25 into firm contact at their edges. This force is preferably applied by the use of spider clamps engaging the ends of the members 24 and 25 respectively and connected together by a screw extending axially through the tubular structure. Nuts are threaded on the ends of the screw to engage the spiders respectively so that by turning the nuts on one of them the spiders may be caused to force the several members 24 and 25 longitudinally in opposite directions and toward each other. This drives the dowels home and presses the edges of the several members 24 into contact with those of the members 25, as illustrated in Fig. 6.

Tests have shown that a culvert constructed as hereinbefore described retains its tight joints under adverse conditions of expansion and contraction such as those resulting from alternately immersing the culvert in water for long periods and then allowing it to dry for like periods. Expansion of the wood merely enlarges the diameter of the structure and when contraction takes place the diameter is reduced, without opening up the joints.

The dowels 19 and 29 are preferably constructed from metal of rust-resistant or non-corroding character to impart permanent and adequate strength. Such metals as stainless steel, brass, bronze, or other suitable alloys may be employed in the construction of the dowels.

Where my improved joint is used to connect panels or sections of buildings, the panels or sections are prefabricated with the tongues, grooves, dowels and dowel holes along parallel edges to be joined. Each wall panel may be provided with dowels projecting from one vertical edge and with dowel holes and grooves formed along the opposite edge. This facilitates assembly in situ and makes its possible to place the panels successively merely by sliding the edge of one downward into engagement with the edge of the panel previously placed in the assembled structure. In such wall panel construction the weight of the individual panels is ordinarily sufficient to close the joint along the vertical edge, the force of gravity acting through the oblique dowels to draw the panels together. As successive panels are added to those previously placed, the dowels are started in the grooves 18 which guide them to the grooves 23 above the dowel holes in which they are to be seated, as indicated in dotted lines in Fig. 1, then the panel is lowered so that the dowels 19 pass simultaneously into the several counter-sinks 22 and dowel holes 20. Studs, columns and corner posts may be formed and provided with oblique dowels and dowel holes to connect panels in appropriate situations. The resulting structures have been found to be unusually easy to erect and to knock down and to possess great strength combined with neat appearance in use.

In some structures the tongues and grooves may be omitted but ordinarily some means for retaining the edges of the wood members in alignment or for guiding the dowels into the dowel holes should be provided to facilitate the assembly of the structure. Use of tongues and grooves or other aligning means, in addition to the dowels, further increases the rigidity and tight continuity of the joint between dowels and reduces the number of dowels required to make a strong fastening.

Having described my invention, what I claim as new and desire to protect by Letters Patent is:

1. A tubular wood structure comprising, a first series of longitudinally extending and spaced wood members, a plurality of dowels projecting obliquely from each edge of each of said members, toward one end of the same and a second series of wood members interposed respectively between the members of said first series and fitting in edge to edge abutment therewith, the edges of said members of the second series being formed with oblique dowel holes to receive said dowels.

2. A tubular wood structure comprising, a first series of longitudinally extending and spaced wood members, a plurality of parallel dowels projecting obliquely from each edge of each of said members toward one end of the same and a second series of wood members interposed respectively between the members of said first series, the edges of said members of the second series being formed with oblique dowel holes to receive said dowels, said dowels being adapted to be driven simultaneously into the several dowel holes by actuating said first series of members longitudinally relative to the second series of members and means extending between the several dowels for aligning the edges of the members of the first series severally with edges of members of the second series.

3. A tubular wood structure comprising, a first series of longitudinally extending and spaced wood members, each formed with tongues along its longitudinal edges, a plurality of parallel dowels projecting obliquely from each edge of each of said members and a second series of wood members interposed between said first mentioned members and each formed with grooves to receive said tongues, the edges of said second series of members being formed with oblique dowel holes to receive said dowels and the members of one of said series of members being adapted to be actuated simultaneously and longitudinally relative to the other series to drive said dowels into said holes.

4. A tubular structure comprising a multiplicity of wooden staves formed to fit together edge to edge and oblique dowels connecting the several edges together, at least one of said staves having a series of parallel dowels inclined obliquely from one edge and toward one end thereof, and another series of parallel dowels extending crossways of the other edge and inclined toward the same end thereof, the adjoining staves being formed with series of oblique dowel holes arranged to receive the several dowels for fastening the staves together.

NEAL T. MacKENZIE.